Figure 3:
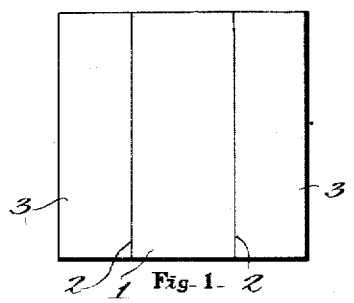
Figure 4:
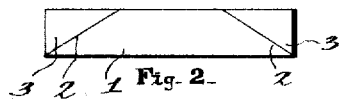
Figure 5:
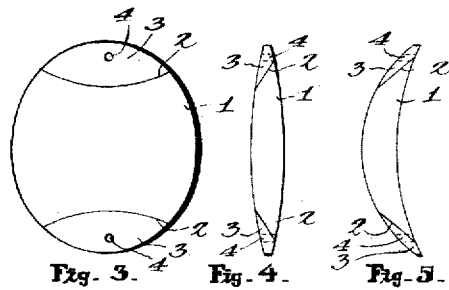

W. W. BRILHART.
RIMLESS OPTICAL LENS.
APPLICATION FILED MAR. 21, 1917.

1,273,573.

Patented July 23, 1918.

Fig-1-

Fig-2-

WITNESSES:

INVENTOR:

William Worthington Brilhart,

UNITED STATES PATENT OFFICE.

WILLIAM WORTHINGTON BRILHART, OF INDIANA, PENNSYLVANIA.

RIMLESS OPTICAL LENS.

1,273,573.  Specification of Letters Patent.  Patented July 23, 1918.

Application filed March 21, 1917. Serial No. 156,394.

*To all whom it may concern:*

Be it known that I, WILLIAM WORTHINGTON BRILHART, a citizen of the United States, residing in the city and county of Indiana, State of Pennsylvania, have invented certain new and useful Improvements in Rimless Optical Lenses, of which the following is a specification.

My invention relates to lenses employed in spectacles, eyeglasses and other optical instruments of that class, in which one or two pieces of flint or hard glass are fused or united by the process of heat, to the surface of an optical lens or lens blank, which is composed of more brittle glass, near its two respective ends where it is expected to fasten the lens, when completed, to a set of metal spectacle or eyeglass mountings, and has for its object the increase of rigidity and durableness of rimless optical lenses.

Lenses of this construction are employed in spectacles and eyeglasses with the one object to lessen the frequent breakage of rimless lenses and is valued most when applied to the more costly forms of lenses.

Generically considered, my invention consists of a lens formed of a single integral piece of glass having a plurality of regions therein, of different or dissimilar rigidity, and my invention also comprehends or consists in the process or method by means of which such a lens is produced.

In the manufacture of my lens, I may take a piece of glass having suitable dimensions, the said glass being composed of ordinary lens material, such as crown glass, bevel and polish two ends thereof, and then take two pieces of harder material, such as flint glass, bevel and polish one surface of each so that they will fit on the said beveled ends of the main piece, and place them respectively thereon and subject the whole to a temperature of heat sufficient to occasion coalescence of the three pieces of glass; that is, subject the same to a temperature sufficient to cause the three pieces of glass to fuse together to form a single, integral, homogeneous plate of glass.

It will be understood that the lenses may be ground to any desired curvature or form, the same as is usual in the manufacture of spectacle, eyeglass and other optical lenses.

Referring to the drawings forming a part of this specification:

Figure I is a plan view of a plate of crown glass with two smaller pieces of harder glass fitted onto the two beveled ends thereof and fused thereto.

Fig. II is a side view of Fig. I.

Fig. III is a face view of an optical lens as ground and finished from the plate of glass illustrated in Figs. I and II, showing in detail the two ends as composed partly of crown and partly of harder glass and with holes also drilled therein near its two ends.

Fig. IV is a side view of Fig. III.

Fig. V is also a side view of Fig. III, as applied to a deep meniscus or toric form of optical lenses and ground from the glass lens blank which is illustrated in Figs. I and II.

In Figs. I to II of the drawings, 1 designates a main slab of crown glass; 2, beveled ends of the main slab, and 3, small slabs of hard glass as fused to the main slab 1.

In Figs. III to V of the drawings, 1 designates the main body portion of an optical lens; 2, the lines of conjunction or connection between the portions of glass of different rigidity; 3, small slabs of hard glass which are fused to the main slab 1; and 4, holes drilled through the glass lens near its two ends.

It will be understood that the ends of the main slab of glass, of which the lens or lens blank is composed, are beveled or shaped and polished while the same slab is either hot or cold; that the smaller pieces of hard glass may be shaped and polished to fit on the said beveled ends of this main slab of glass or they may be applied thereto while in a molten state.

It will be further understood that the three pieces of glass may be assembled and the whole subjected to a heating process, for the purpose of raising the temperature to a point sufficient to occasion the fusing or welding of the three pieces of glass together, to form a single integral piece of glass which may be ground to any curvature or form desired, as, for instance, spherical, as is illustrated in Figs. III and IV, or deep meniscus and toric, as in Fig. V; that any suitable furnace or other means may be employed for subjecting the glass to heat to raise the same to a temperature necessary to occasion a coalescence or welding together of the separate pieces of glass in the process of manufacturing optical lenses or lens blanks as is embodied in this my invention.

In the constructions illustrated in the drawings a lens is formed of three pieces of glass fitted and fused together, as is described above, being thus made uniformly rigid, or nearly so, from the central portion to the two ends thereof where a set of metal spectacle or eyeglass mounting may be fastened.

The lines of conjunction or connection between the portions of glass of different rigidity embodied in these lenses are invisible, but are clearly indicated in the several drawings.

I am aware that there are patents granted upon fused bifocal lenses, but since my invention does not relate to the visual area of optical lenses, my claims do not conflict therewith, but I claim:

1. An optical glass lens consisting of an integral piece of glass ground with even surfaces in which the rigidity thereof is built up by fusing, to or upon a main piece of glass of ordinary optical material, such as crown glass, smaller pieces of harder material, such as flint glass, at one or both of the respective ends thereof where a set of metal eyeglass or spectacle mountings may be fastened thereto.

2. An optical glass lens consisting of an integral piece of glass ground with even surfaces in which the rigidity thereof is built up uniformly or gradually from the center to the two respective ends thereof where a set of metal spectacle or eyeglass mountings may be fastened, the lens blank from which this lens is ground being composed of a main slab of glass which is beveled to a required slope at two opposite ends thereof where two smaller slabs of harder glass are respectively fused thereto, these fused ends corresponding to the ends of the finished lens.

3. An optical glass lens blank consisting of an integral piece of glass in which the rigidity thereof is built up by fusing respectively, to or upon the two opposite ends of the main slab thereof, which is composed of ordinary optical material, such as crown glass, two smaller slabs of harder material, such as flint glass, these fused ends corresponding to the ends of a finished rimless optical lens where a set of metal spectacle or eyeglass mountings may be fastened.

4. The method of producing an optical glass lens blank, consisting of an integral piece of glass in which the rigidity thereof is built up uniformly or gradually from the center to the two opposite ends thereof, which consists in, first, beveling the two opposite ends of a main slab of ordinary optical material, such as crown glass, to required slopes; and, second, fusing respectively thereto two smaller slabs of harder material, such as flint glass.

WILLIAM WORTHINGTON BRILHART.

Witnesses:
J. A. CROSSMAN,
WALTER H. AYERS.